United States Patent
Itzkovitz et al.

(10) Patent No.: US 7,496,111 B2
(45) Date of Patent: Feb. 24, 2009

(54) INTERFACE FOR INTELLIGENT NETWORK SERVICES

(75) Inventors: Ayal Itzkovitz, Haifa (IL); Leonid Voldman, Haifa (IL)

(73) Assignee: Convergin Israel Ltd., Herzliya (IL)

( * ) Notice: Subject to any disclaimer, the term of this patent is extended or adjusted under 35 U.S.C. 154(b) by 1016 days.

(21) Appl. No.: 10/344,291

(22) PCT Filed: Aug. 5, 2001

(86) PCT No.: PCT/IL01/00723

§ 371 (c)(1),
(2), (4) Date: Apr. 17, 2003

(87) PCT Pub. No.: WO02/12976

PCT Pub. Date: Feb. 14, 2002

(65) Prior Publication Data

US 2003/0165135 A1 Sep. 4, 2003

Related U.S. Application Data

(60) Provisional application No. 60/223,878, filed on Aug. 8, 2000.

(51) Int. Cl.
*H04J 3/16* (2006.01)
*H04J 3/22* (2006.01)
*H04J 3/12* (2006.01)
(52) U.S. Cl. ..................... 370/467; 370/522
(58) Field of Classification Search ............... 370/356, 370/401, 522, 524, 467
See application file for complete search history.

(56) References Cited

U.S. PATENT DOCUMENTS

| 5,566,235 | A | 10/1996 | Hetz | |
| 6,115,746 | A | 9/2000 | Waters et al. | |
| 6,226,373 | B1 | 5/2001 | Zhu et al. | |
| 6,366,658 | B1 * | 4/2002 | Bjornberg et al. | 379/221.08 |
| 6,418,205 | B2 * | 7/2002 | Capers et al. | 379/112.01 |

(Continued)

FOREIGN PATENT DOCUMENTS

WO        9921345        4/1999

(Continued)

OTHER PUBLICATIONS

Zhu, et al., 2001. "IIN model: modifications and case study". Computer Networks 35(5): 507-519.

(Continued)

*Primary Examiner*—Kevin C Harper
(74) *Attorney, Agent, or Firm*—Darby & Darby PC

(57) ABSTRACT

A service gateway (42) includes one or more network adapters (62), configured to capture signaling messages in respective communication networks (28, 50, 56) and to process the signaling messages to generate network signaling primitives indicative of network events in a network-independent format. A call processor (60) is coupled to receive and process the signaling primitives from the network adapters so as to generate service requests for processing by one or more application servers (44, 48, 58), and to receive and process service instructions from the application servers in response to the service requests so as to generate network instruction primitives to the one or more network adapters, causing the network adapters to convey signaling instructions to the respective networks.

41 Claims, 8 Drawing Sheets

U.S. PATENT DOCUMENTS

| | | | | |
|---|---|---|---|---|
| 6,661,785 | B1 * | 12/2003 | Zhang et al. | 370/352 |
| 6,940,847 | B1 * | 9/2005 | Glitho et al. | 370/352 |
| 6,963,583 | B1 | 11/2005 | Foti | |
| 6,967,972 | B1 * | 11/2005 | Volftsun et al. | 370/466 |
| 6,990,124 | B1 * | 1/2006 | Dalias et al. | 370/522 |
| 7,161,925 | B2 * | 1/2007 | Wallenius et al. | 370/338 |
| 2001/0017483 | A1 | 8/2001 | Frohberg | |
| 2004/0176089 | A1 | 9/2004 | Sylvain | |
| 2004/0204095 | A1 | 10/2004 | Cyr et al. | |
| 2004/0246990 | A1 | 12/2004 | Krishnamurthi et al. | |
| 2005/0009520 | A1 | 1/2005 | Herrero et al. | |

FOREIGN PATENT DOCUMENTS

| | | |
|---|---|---|
| WO | 0042760 | 7/2000 |

OTHER PUBLICATIONS

"Wireless Application Protocol. Wireless Telephony Application Specification". WAPWTA Version 08, Nov. 1999, pp. 36-37.

Perdikeas, et al., 2001. "Parlay-based service engineering in a converged Internet-PSTN environment". Computer Networks 35(5): 565-578.

U.S. Appl. No. 60/223,878, entitled "An Intelligent Network Archtecture based on handset Intelligence", filed Aug. 8, 2000.

Faynberg et al., "The Development of the Wireless Intelligent Network (WIN) and Its Relation to the International Intelligent Network Standards", Bell Labs Technical Journal (Summer 1997), pp. 57-80.

The Parlay Group, http://www.parlay.org.

"Parlay APIs 2.1: Generic Call Control Service Interfaces", Jun. 2000.

Annex B. of Standard EN 301 140-1 V1.3.4 (Jun. 1999) of the European Telecommunications Standards Institute (ETSI—Sophia Antipolis, France), entitled "Intelligent Network (IN); Intelligent Network Application Protocol (INAP); Capability Set 2 (CS2); Part 1: Protocol Specification."

* cited by examiner

INTERFACE FOR INTELLIGENT NETWORK SERVICES

CROSS-REFERENCE TO RELATED APPLICATIONS

This application claims the benefit of U.S. Provisional Patent Application 60/223,878, filed Aug. 8, 2000, which is incorporated herein by reference.

FIELD OF THE INVENTION

The present invention relates generally to Intelligent Networks, and specifically to devices and methods for carrying out service switching functions associated with Intelligent Network services.

BACKGROUND OF THE INVENTION

The Intelligent Network (IN) is an architectural concept that enables real-time execution of network services and customer applications in a distributed environment of interconnected computers and switching systems, such as wireline and wireless telephone networks. IN standards have been promulgated by the International Telecommunications Union (ITU-T) and by the American National Standards Institute (ANSI). A useful summary of IN concepts and standards is provided by Faynberg et al., in "The Development of the Wireless Intelligent Network (WIN) and Its Relation to the International Intelligent Network Standards", *Bell Labs Technical Journal* (Summer, 1997), pp. 57-80, which is incorporated herein by reference.

FIG. 1 is a block diagram that schematically illustrates a cellular telephone network 20 that is configured for provision of IN services, as is known in the art. A cellular telephone 22 communicates with the network via a base station controller (BSC) 24, which is coupled to a mobile switching center (MSC) 26. Although for the sake of simplicity, only a single BSC and MSC are shown in the figure, typical cellular networks comprise multiple BSCs, MSCs and other elements. MSC 26 serves as a switch, receiving signaling and voice communications from telephone 22 via BSC 24, and transferring the communications to other network elements in order to complete and carry out calls made by or to telephone 22. The BSC, MSC and other elements of the cellular network are connected by a public land mobile network (PLMN) 28, which typically operates in accordance with the well-known Signaling System 7 (SS-7) protocol.

In order to provide IN services, MSC 26 is programmed with a call control function (CCF) 30 and a service switching function (SSF) 32, as dictated by IN standards. The CCF provides basic switching capabilities, including the means to establish, manipulate and release calls and connections. When the CCF detects signaling passing through the MSC that is related to an IN service, it suspends the call temporarily and passes a trigger to the SSF. Based on the trigger, SSF 32 passes control of the call to a service control point (SCP) 34. While CCF 30 and SSF 32 are implemented in the network switches themselves, SCP 34 is typically a separate element, which communicates with the network switches over the SS7 network. Communications between SSF 32 and SCP 34 are based on a standard IN Application Protocol (INAP). The SCP processes the call, and then sends instructions back via INAP to SSF 32 as to how the call should be handled by CCF 30.

As will be appreciated from FIG. 1, the basic idea of IN is to move intelligent services out of the network switches to separate service points, such as SCP 34. Multiple SCPs may communicate with a given switch. SSF 32 of the switch is programmed to choose the SCP for each call depending on the trigger parameters. By the same token, a single SCP can communicate with and service multiple switches (although not all the switches in a network are necessarily IN-enabled). The unified IN architecture allows different service providers to create SCPs that implement their own particular services, independent of the underlying network technology.

For example, assuming SCP 34 is responsible for provision of an 800-number service, the CCF/SSF will suspend and refer 800-number calls to the SCP, which analyzes the calls using its own service logic and then returns instructions to the SSF. These instructions would typically cause MSC 26 to reroute the call to an ordinary subscriber number of the call recipient, while charging the recipient for the call if appropriate. On the other hand, the SCP might instruct the SSF/CCF to transfer the call to an intelligent peripheral (IP) 36. Typical IP functions include playing prerecorded or synthesized voice responses, or capturing Dual Tone Multi-Frequency (DTMF) input from the keypad of telephone 22. These IP functions are usually controlled by commands from the SCP, which then instructs the SSF/CCF as to how the call should proceed. Although the example shown in FIG. 1 relates to wireless network 20, the principles embodied in this example relate to wireline networks, as well.

Introducing IN services in a non-IN-enabled network requires local exchange switches to be replaced or at least reprogrammed to provide the necessary CCF/SSF functionality, as well as to upgrade this functionality in response to changes in the IN standard and required capabilities. (For example, the original IN standard capability set, CS-1, was supplemented in 1997 to define a much richer and broader set. CS-2, and further changes of this sort can be expected in the future.) In cellular networks, where a given subscriber can be expected to connect from any point to any point in the network, any upgrade must be implemented on all of the switches in the network, at very substantial cost. This cost is a serious hindrance to the introduction of new and enhanced IN functionalities.

SUMMARY OF THE INVENTION

It is an object of the present invention to provide improved devices and methods for provision of network services, and particularly IN services.

It is a further object of some aspects of the present invention to provide systems that enable a service provider to furnish IN services over a variety of different types of networks.

It is yet a further object of some aspects of the present invention to provide an architecture that facilitates upgrading and diversification of IN capabilities and services.

In preferred embodiments of the present invention, a flexible service gateway, separate from network switching equipment, acts as a service switching point (SSP) for IN services. The gateway captures network signaling messages and assumes the service switching function (SSF) that is programmed into the switching equipment itself in conventional IN architecture. By separating IN functionality from network switching equipment, the SSP gateway enables upgraded IN capabilities, platforms and services to be provided simply and economically, without the need to replace or reprogram the switching equipment itself.

The SSP gateway comprises three essential functional blocks: one or more network adapters, a basic call processor and one or more application adapters. The network adapters are designed to interface with different network types, including both SS7 and packet-switched networks. The role of the network adapter is to capture the appropriate signaling at the network switches and to generate events, based on the signaling, in a network-independent form. The call processor is then able to process these events, essentially performing the IN service switching function in place of the network switch, irrespective of the network type. The call processor communicates with application servers via respective application adapters, choosing the server to notify based on the event type. The application adapters are designed to interface with different application platforms, including both standard INAP SCPs and other platforms not yet supported by IN standards. Instructions from the application servers are conveyed by the call processor back through the network adapter to control the network switches.

Thus, the SSP gateway provides a generic, platform-independent alternative to conventional IN switch functionality. It can be made fully compliant with current IN standards, so as to assume the CCF/SSF functions in a manner that is transparent both to the network and to the SCP. At the same time, the gateway is sufficiently flexible to support multiple network types and different application platforms simultaneously. Because the gateway call processor uses an abstract, network-independent basic call model, the gateway can accommodate new network technologies and application platforms simply by addition of appropriate adapters. New IN capabilities can be implemented by upgrading the call processor, with no need to reprogram or upgrade network switching equipment.

In some preferred embodiments of the present invention, the SSP gateway network adapter is configured to communicate logically with a browser function provided in network subscriber equipment. This browser function generates events in connection with telephone calls placed using the subscriber equipment. The SSP gateway receives and processes these events via an appropriate network adapter, and sends call control messages back to the browser function of the subscriber equipment. Thus, the gateway creates a logical link directly between the subscriber equipment and IN service platforms, so that service provision and call control are carried out using the built-in "intelligence" of the subscriber equipment, while the network switching equipment is relieved of these tasks.

In one of these embodiments, the subscriber equipment comprises a mobile telephone that is configured with Wireless Access Protocol (WAP) software and communicates with a WAP gateway in the cellular telephone network. The WAP software of the mobile telephone includes a Wireless Telephony Application (WTA) interface, as is known in the art, which is programmed to generate particular Hypertext Transfer Protocol (HTTP) messages to notify the SSP gateway when certain call events occur. The SSP gateway network adapter in this embodiment comprises a WTA proxy, which receives these HTTP messages via the WAP gateway, and then passes the appropriate events to the gateway call processor. The SSP gateway communicates with the appropriate SCP or application server and accordingly sends call control instructions in the form of HTTP messages back to the mobile telephone via the WTA proxy.

In other preferred embodiments of the present invention, the SSP gateway comprises an application adapter compatible with CAMEL (customized applications for mobile network enhanced logic), as defined in standards of the Global System for Mobile Communications (GSM). CAMEL is designed to enable GSM cellular networks to offer services such as roaming between different networks. The SSP gateway allows CAMEL-based services to be introduced without modification to the switching equipment.

Although preferred embodiments are described herein with specific reference to IN systems and standards and to certain network types, the principles of the present invention are applicable generally to communication networks and service applications of substantially any types. Indeed, the straightforward applicability of the SSP gateway to different types of networks and applications is a major advantage of the present invention.

There is therefore provided, in accordance with a preferred embodiment of the present invention, a service gateway, including:

one or more network adapters, configured to capture signaling messages in respective communication networks and to process the signaling messages to generate network signaling primitives indicative of network events in a network-independent format;

a call processor, coupled to receive and process the signaling primitives from the network adapters so as to generate service requests for processing by one or more application servers, and to receive and process service instructions from the application servers in response to the service requests so as to generate network instruction primitives to the one or more network adapters, causing the network adapters to convey signaling instructions to the respective networks.

Preferably, the call processor is adapted to generate service request primitives responsive to the signaling primitives, and the gateway includes one or more application adapters, which are coupled to receive the service request primitives from the call processor and, responsive thereto, to generate the service requests to the application servers using respective application protocols of the servers. Most preferably, the application servers are based on respective application platforms, including at least two different platforms having different respective application protocols, and the one or more application adapters include a plurality of application adapters, which are respectively configured to communicate with the respective application servers using the different application protocols.

Additionally or alternatively, the communication networks include two networks having different, respective network signaling protocols, and the one or more network adapters include at least two network adapters, which are respectively configured to capture the signaling messages in the different protocols. In a preferred embodiment, the two networks include a circuit-switched network and a packet network, wherein one of the two networks operates according to a Signaling System 7 (SS7) protocol while the other operates according to a non-SS7 protocol.

Preferably, at least one of the one or more network adapters is configured to capture the signaling messages from one or more switches in at least one of the communication networks and to convey the signaling instructions to the one or more switches. In a preferred embodiment, the at least one of the communication networks includes a cellular telephone network, and the switches include mobile switching centers (MSCs). Most preferably, the at least one of the network adapters is configured to capture the signaling messages simultaneously from multiple switches in the at least one of the communication networks.

In a preferred embodiment, at least one of the one or more network adapters includes a telephony server, which is configured to communicate with a client program running on a user communication terminal, wherein the client program sends the signaling messages to the telephony server responsive to voice calls involving the user communication terminal.

Preferably, the telephony server returns the signaling instructions to the user communication terminal in the form of instructions to be executed by the client program. Further preferably, the client program includes a browser program, and the instructions are in the form of scripts to be run by the browser program. Most preferably, the browser program includes a Wireless Application Protocol (WAP) browser having a Wireless Telephony Application (WTA) interface, and the telephony server includes a WTA proxy. Additionally or alternatively, the client program sends the signaling messages in the form of Hypertext Transfer Protocol (HTTP) requests directed to different uniform resource locators (URLs) that are associated with the telephony server and are respectively bound to different types of the events that are detected by the user communication terminal, and the telephony server processes the HTTP requests and returns the scripts responsive to the URLs.

There is also provided, in accordance with a preferred embodiment of the present invention, a service gateway, for providing application services to a communication network using application servers having different respective application protocols, the gateway including:

a call processor, coupled to receive and process indications of network events occurring in a communication network and, responsive thereto, to generate service request primitives in a form substantially independent of the application protocols; and a plurality of application adapters, which are coupled to receive the service request primitives from the call processor and, responsive thereto, to generate service requests to at least two of the application servers using the different, respective application protocols, and to receive and process service instructions from the application servers in response to the service requests so as to generate service response primitives to the call processor, causing the call processor to generate signaling instructions to be conveyed to the network.

Preferably, the call processor is configured to receive the signaling messages from one or more switches in the communication network, and to generate the signaling instructions to be conveyed to the switches.

In a preferred embodiment, the gateway includes a telephony server, which is configured to communicate with a client program running on a user communication terminal, wherein the client program sends the indications of the network events to the telephony server responsive to voice calls involving the user communication terminal, and wherein the telephony server returns the signaling instructions to the user communication terminal in the form of instructions to be executed by the client program.

In a further preferred embodiment, the plurality of application adapters includes an Intelligent Network Application Protocol (INAP) adapter for conveying the service requests to and receiving the service instructions from a Service Control Point (SCP) coupled thereto. Additionally or alternatively, the plurality of the application adapters includes a Parlay adapter for conveying the service requests to and receiving the service instructions from an application server coupled thereto. Further additionally or alternatively, the plurality of the application adapters includes a customized applications for mobile network enhanced logic (CAMEL) adapter for conveying the service requests and receiving the service instructions in connection with a roaming application.

In still another preferred embodiment, the call processor is further coupled to communicate with an Intelligent Peripheral and to generate the signaling instructions so as to create a connection via the network between the Intelligent Peripheral and a user communication terminal, under control of the call processor.

There is additionally provided, in accordance with a preferred embodiment of the present inventions a method for providing a communication service, including:

capturing signaling messages in one or more communication networks;

processing the signaling messages to generate network signaling primitives indicative of network events in a network-independent format;

processing the signaling primitives using a common, network-independent call model for the one or more networks, so as to generate service requests for processing by one or more application servers;

receiving service instructions from the application servers in response to the service requests;

processing the service instructions using the call model, so as to generate network instruction primitives in the network-independent format; and processing the network instruction primitives to generate signaling instructions to the respective networks.

There is further provided, in accordance with a preferred embodiment of the present invention, a method for providing application services to a communication network using application servers having predefined respective application protocols, the method including:

receiving indications of network events occurring in a communication network;

responsive to the events, generating service request primitives in a form substantially independent of the application protocols;

processing the service request primitives so as to generate service requests to at least two of the application servers using the different, respective application protocols;

receiving service instructions from the application servers in the different, respective application protocols in response to the service requests;

processing the service instructions so as to generate service response primitives in the from substantially independent of the application protocols; and responsive to the service response primitives, generating signaling instructions to be conveyed to the network.

The present invention will be more fully understood from the following detailed description of the preferred embodiments thereof, taken together with the drawings in which:

DETAILED DESCRIPTION OF PREFERRED EMBODIMENTS

Figure 1:
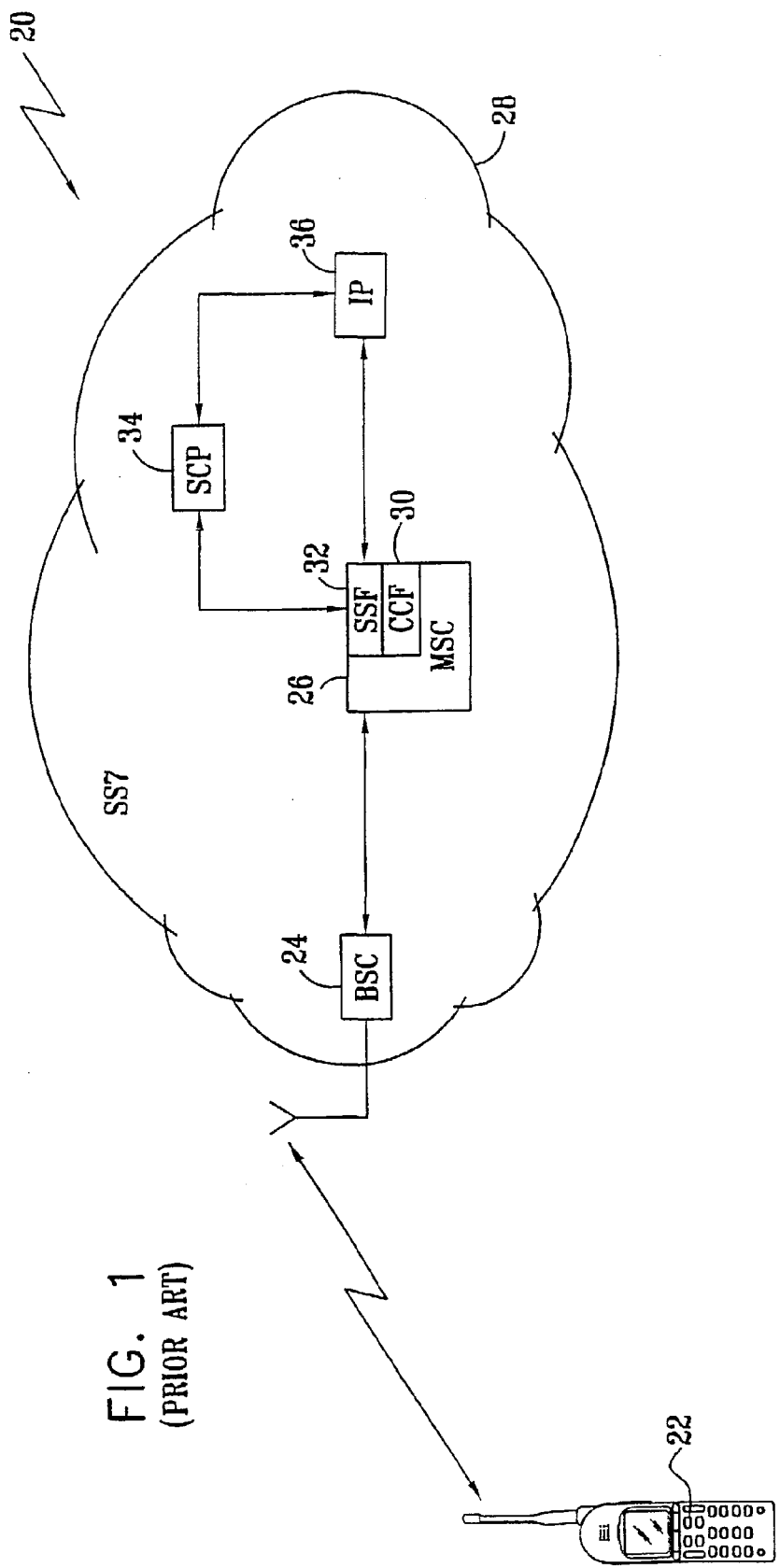
FIG. 1 is a block diagram that schematically illustrates a cellular telephone network that is configured for provision of IN services, as is known in the art.
Figure 2:
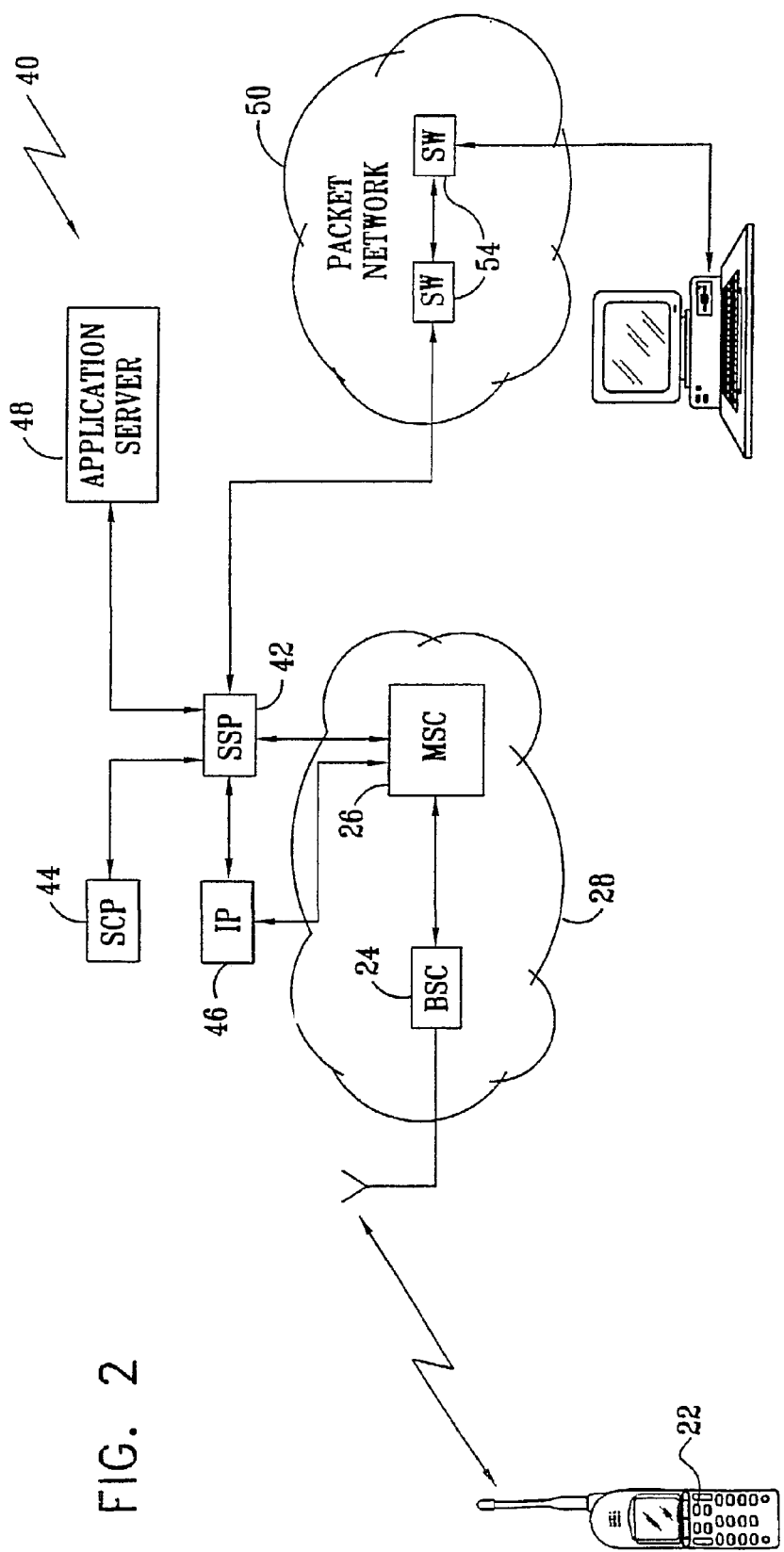
FIG. 2 is a block diagram that schematically illustrates a system for provision of IN services, in accordance with a preferred embodiment of the present invention.

Reference is now made to FIG. 2, which is a block diagram that schematically illustrates a system 40 for providing network services, in accordance with a preferred embodiment of the present invention. In contrast to the system shown in FIG. 1, system 40 comprises a SSP gateway 42, which performs the functions of CCF 30 and SSF 32 instead of integrating these functions in MSC 26. Thus, in system 40 the functions of the SSP are, essentially, moved out of the MSC to a separate unit, which may be remote from the central SS7 network. Details of gateway 42 are shown in the figures that follow.

Like SSF 32, SSP gateway 42 communicates with a SCP 44 using the INAP protocol. Because the SCP does not need to communicate directly with MSC 26, it too can be deployed outside the SS7 network. In addition, the SSP gateway preferably comprises other application interfaces, for communicating with a non-INAP application server 48, such as a CAMEL or Parlay-based server. ("Parlay" refers to a set of open application programming interfaces [APIs] that have been standardized by an industry consortium known as the Parlay Group. Information regarding the Parlay Group is available at www.parlay.org. Relevant aspects of the Parlay APIs are described, for example, in a specification document entitled *Parlay APs 2.1: Generic Call Control Service Interfaces* [June, 2000], which is incorporated herein by reference.) These interfaces enable tie gateway to simultaneously support multiple network services of different types and with different interface characteristics. The SCPs and other servers that are used to provide these services may be in proximity to gateway 42, or they may alternatively be at remote locations and communicate with the gateway over a data network or other communication link. Preferably, the SSP gateway is also configured to invoke and control an intelligent peripheral (IP) 46, as is known in the IN art.

In addition to its SS7 interface to MSC 26, SSP gateway 42 preferably has interfaces to other network types, such as a packet network 50. Network 50 comprises packet switches 54 that communicate with user data terminals 52. The packet network may comprise, for example, a Global Packet Radio Service (GPRS) cellular packet network or a land-based packet network, such as the Internet. Similarly, gateway 42 may comprise interfaces to other types of circuit-switched networks, such as the Public Switched Telephone Network (PSTN). Multiple network interfaces enable the gateway to communicate with multiple networks simultaneously. Thus, a single SCP 44 or other application server 48 could be used to provide services on different networks of the same or different types.

Figure 3:
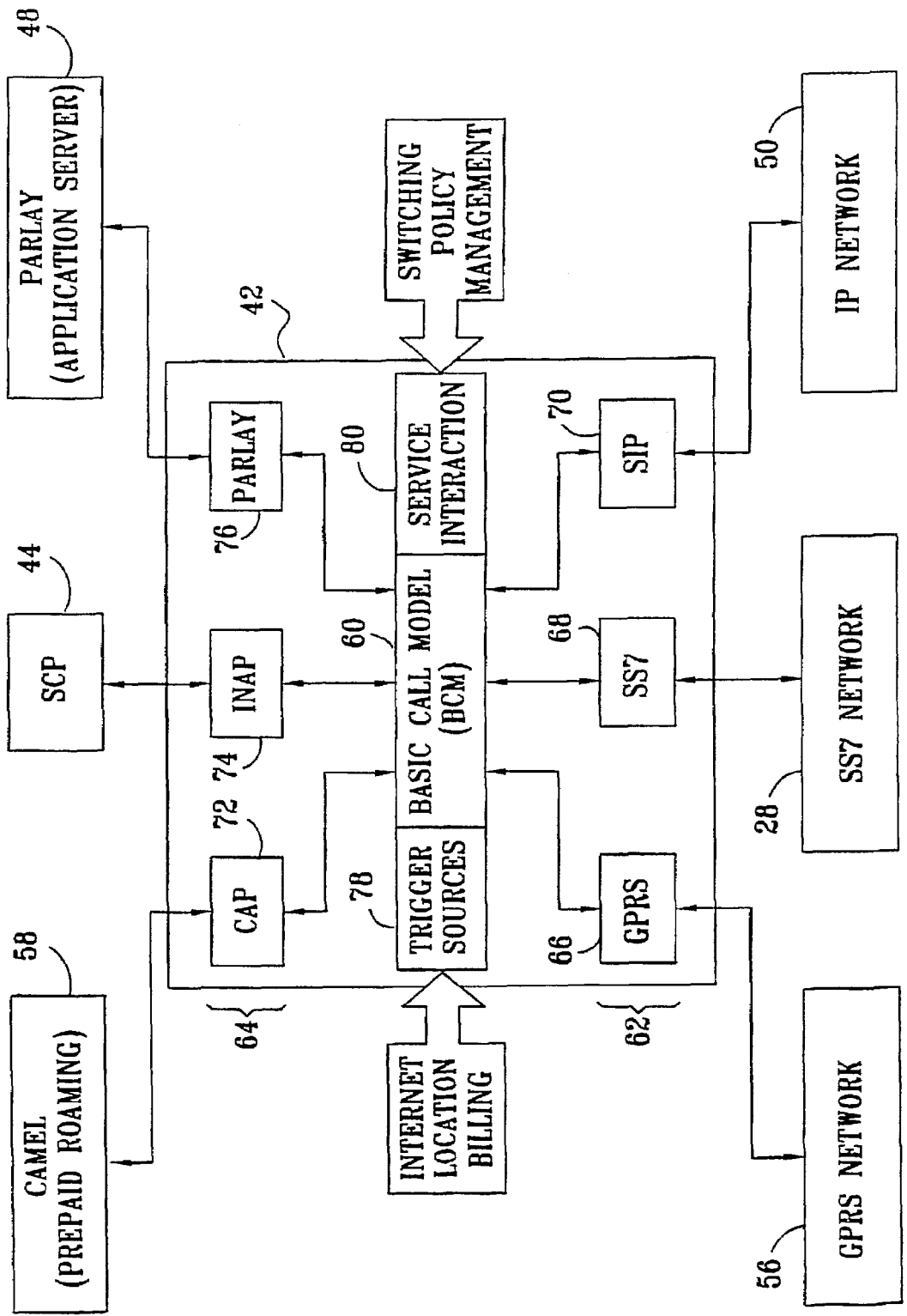
FIG. 3 is a block diagram that schematically illustrates a SSP gateway, in accordance with a preferred embodiment of the present invention.

FIG. 3 is a block diagram that schematically shows details of SSP gateway 42, in accordance with a preferred embodiment of the present invention. The gateway comprises three essential components:

A call processor 60, which operates according to a basic call model (BCM), independent of the type or types of networks that gateway 42 is serving.

Network adapters 62, which couple the gateway to networks of different types. By way of example, adapters 62 include a GPRS adapter 66 for communicating with a GPRS cellular packet network 56, a SS7 adapter 68 for communicating with SS7 network 28, and a Session Initiation Protocol (SIP) adapter 70 for communicating with a packet network 50, operating in accordance with the Internet Protocol and for running SIP-based protocols for IP telephony.

Application adapters 64, which couple the gateway to service application platforms of different types. In the example shown in the figure, adapters 64 include a CAMEL Application Protocol (CAP) adapter 72 for communicating with a CAMEL server 58 (for services such as prepaid roaming), an INAP adapter 74 for communicating with a standard IN SCP 44, and a Parlay adapter 76 for communicating with a Parlay-based application server 48.

These components may be implemented as separate hardware circuits in a modular hardware design, or they may alternatively be implemented as one or more processes in software running on a common central processing unit (CPU), or as a combination of hardware and software elements. Other types of network adapters 62 and application adapters 64 will be apparent to those skilled in the art, and may be created and added to gateway 42 in a straightforward manner, based on the principles described herein.

Call processor 60 receives events from network adapters 62 and processes these events in accordance with service-related criteria, stored in databases within or accessible to gateway 42. A trigger sources database 78 provides additional user data, such as the location of telephone 22 and the user's identity, profile information, and credit balance (for prepaid services). Internet events can also be taken into account, for example, when the user goes on line or off line. The trigger sources in database 78 enable gateway 42 to detect and notify the application servers of the occurrence of certain types of decision points (DPs). A service interaction database 80 allows the call processor to be programmed with switching and management policies on a per-user basis, so as to control the "service interaction" functions of the gateway. "Service interaction" in this context refers to features such as service preferences and order of execution of operations.

As noted above, call processor 60 processes call information received from adapters 62 and returns instructions to the adapters in a manner that is independent of both network protocols and application platforms served by gateway 42. The BCM used by processor 60 is defined in terms of protocol-independent signaling control primitives, which correspond to events such as call setup, progress, and disconnection, and to platform-independent service function primitives such as call initiation, connection, charging and release. An example of signaling control primitives that can be used in this context is the set of SiCon primitives defined in Annex B of standard EN 301 140-1 V1.3.4 (1999-06) of the European Telecommunications Standards Institute (ETSI-Sophia Antipolis, France), entitled "Intelligent Network (IN); Intelligent Network Application Protocol (INAP); Capability Set 2 (CS2); Part 1: Protocol Specification," which is incorporated herein by reference. The SigCon primitives listed in this standard are intended for use in mapping different signaling protocols in the Integrated Services Digital Network, (ISDN) protocol family, such as DSS.1 and ISUP, to INAP, rather than for creation of a protocol-independent generic interface between different network adapters 62 and a protocol-independent call processor as in preferred embodiments of the present invention.

All of network adapters 62 communicate with processor 60 over the same protocol-independent interface. The network adapters convert the respective network signaling from MSC 26 to signaling primitives for processing by processor 60, which then passes platform-independent service request primitives to the appropriate application adapter 64. The application adapter generates the actual service requests according to the application protocol of the application server, and then converts the service instructions from the application server back into platform-independent service instruction primitives for further processing by processor 60. Finally, processor 60 outputs network instruction primitives, based on which the network adapter sends the appropriate network signaling back to MSC 26.

Figure 4:
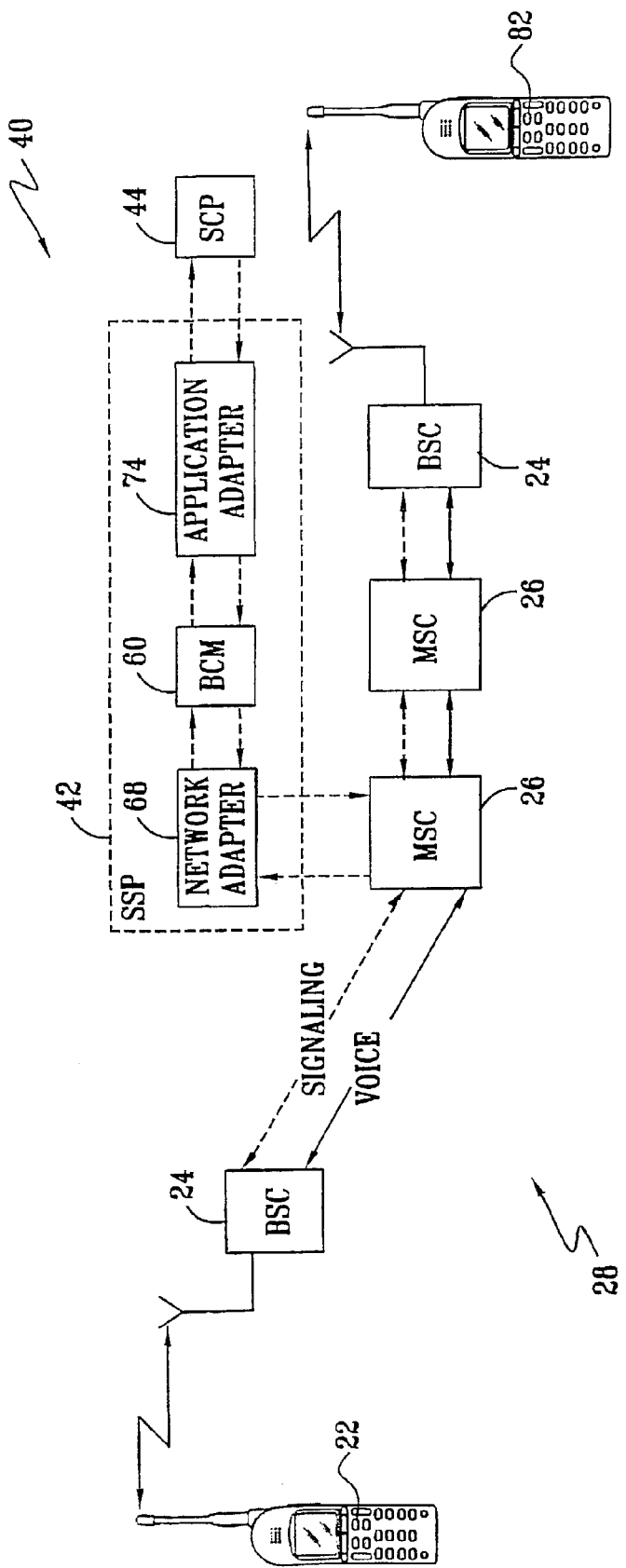
FIG. 4 is a block diagram that schematically illustrates signaling and voice flow in a cellular network under control of a SSP gateway, in accordance with a preferred embodiment of the present invention.

FIG. 4 is a block diagram that schematically shows signal flow in system 40, illustrating the operation of gateway 42, in accordance with a preferred embodiment of the present invention. When a user of telephone 22 initiates a call to another telephone 82, a signaling message is first sent from telephone 22, via BSC 24 to MSC 26. Telephone 22 is referred to hereinafter as the originating telephone, while telephone 82 is called the terminating telephone. MSC 26 is programmed to divert signaling of relevance to IN calls to gateway 42, using methods of SS7 signaling control known in the art. SS7 adapter 68 receives the signaling messages and converts them to protocol-independent signaling primitives, which it passes to call processor 60, and then waits for a response.

Based on the BCM and the events indicated by the primitives, processor 60 determines what service response, if any, is required from SCP 44 before proceeding with the call. It accordingly generates a service request primitive which it passes to INAP adapter 74, and suspends the call while awaiting the application response. The INAP adapter converts the primitive from its platform-independent form to a standard INAP service request, and passes the request to SCP 44. In the present example, the request might be a trigger to a provider of prepaid or recipient-paid calling services to approve and begin charging for this call and/or, possibly, to provide a different number for the terminating telephone to which the call should be diverted. The SCP returns an INAP service response to adapter 74, which accordingly passes a service response primitive to call processor 60. The call processor processes the response and conveys a network instruction primitive back to adapter 68, which generates the appropriate signaling response message in standard SS7 form, such as an ISUP Initial Addressing Message (IANI), and passes the message to MSC 26.

The MSC then proceeds to set up signaling and voice links toward terminating telephone 82. Gateway 42 continues to capture and process relevant signaling messages conveyed in SS7 network 28. It is possible to program some or all of the MSCs in the network to divert signaling messages to gateway 42, so that the gateway has a "virtual presence" at all of the programmed MSCs. Typically, this sort of diversion is accomplished by local loop techniques or signaling transfer point (STP) configuration, as is known in the art.

Figure 5:
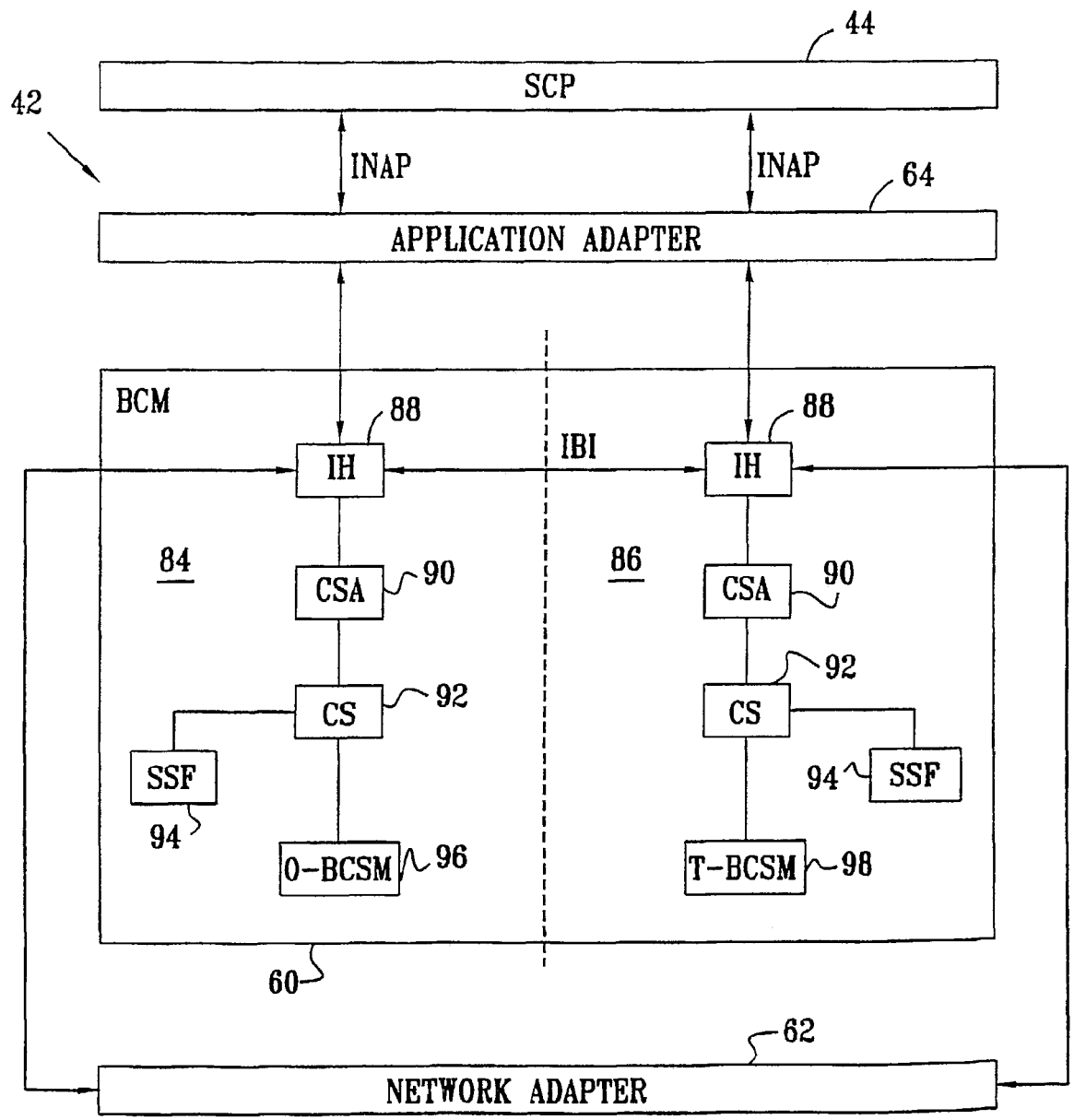
FIG. 5 is a block diagram that schematically shows details of a call processor used in the SSP gateway of FIG. 3, in accordance with a preferred embodiment of the present invention.

FIG. 5 is a block diagram that schematically shows details of call processor 60, including key functional blocks and communications among these blocks in processing a call, in accordance with a preferred embodiment of the present invention. Typically, these functional blocks, as described below, are implemented as objects in an object-oriented programming model used in programming the call processor. Alternatively, some or all of the blocks may be implemented as hardware processing elements. The functional decomposition of the call processor conforms to the INAP model described in Annex A of the above-mentioned ETSI standard EN 301 140-1.

Processor 60 views the BCM as being composed of two half-call models 84 and 86, corresponding respectively to the originating and terminating telephones. Each half-call model has an interface handler (IH) 88, which is responsible for communicating (using the protocol-and platform-independent primitives) with network adapter 62 and application adapter 64, as well as communicating with the IH of the other half-call over an intra-BCM interface (IBI). Either or both of the IHs can interact with the network and with applications through the network and application adapters. In fact, the two half-calls represented by models 84 and 86 may have different instances of the same or different services running at the same time.

For internal processing of calls by processor 60, each IH 88 communicates with a call segment (CS) block 92 of the respective half-call model, via a call segment association (CSA) function 90. The IH block uses the CSA function to set up and maintain call segments of calls in progress and for handling events at the call segment level. Based on these events, CS block 92 creates and communicates with a basic call state module (BCSM), representing the state of the call, which may be an originating BCSM (O-BCSM) 96 or a terminating BCSM (T-BCSM) 98, depending on whether the half-call belongs to the originating or terminating telephone. The CS block also creates and interacts with a SSF 94, which detects and processes service-related events.

As an example of the operation of processor 60, when telephone 22 attempts to dial to telephone 82, network adapter 62 captures the call setup signaling and sends a call setup indication primitive to IH 88 of originating model 84. IH 88 passes the indication to CSA function 90, which sends the indication on to CS block 92. The CS block sets up O-BCSM 96, which generates a detection point (DP) event corresponding to the call setup. This event is passed to SSF model 94, which looks up the DP in an event database to determine how it should be handled. Upon determining that SCP 44 is registered to receive notification of this type of event, SSF model 94 instructs CS 92 to suspend the call and to send a DP service request primitive, indicating that call setup has been requested. The DP primitive is passed by CS block 92, via CSA function 90 and IH 88 to application adapter 64. The adapter converts the DP primitive to an INAP service request for processing by SCP 44.

Assuming that the SCP determines that the call can proceed, it sends a point-in-call (PIC) resume message back via adapter 64 to IH 88. The IH passes a corresponding PIC resume primitive back via CSA function 90 and CS block 92 to SSF model 94, indicating that call setup should proceed. The SSF model advances to its next state and passes the appropriate setup indication back to the CS block, which then instructs O-BCSM 96 to advance its state, as well. IH 88 of originating, half-call model 84 also passes a setup request indication to the counterpart IH in terminating half-call model 86, causing T-BCSM 98 to be set up, as well. The IH of each half-call receives an indication from the respective CS block that all elements of the half-call are ready to proceed. In both half-calls, the IH accordingly sends an instruction primitive to network adapter 62, which signals MSC 26 to complete the call setup.

Subsequent DP events occurring during the call are handled in similar fashion. These events may be generated by actions of the users of telephones 22 and 82, or by other occurrences in the network. Either of the users may also terminate the call, generating a release request event for processing by processor 60. The call may also be terminated upon a release instruction from SCP 44.

Figure 6:
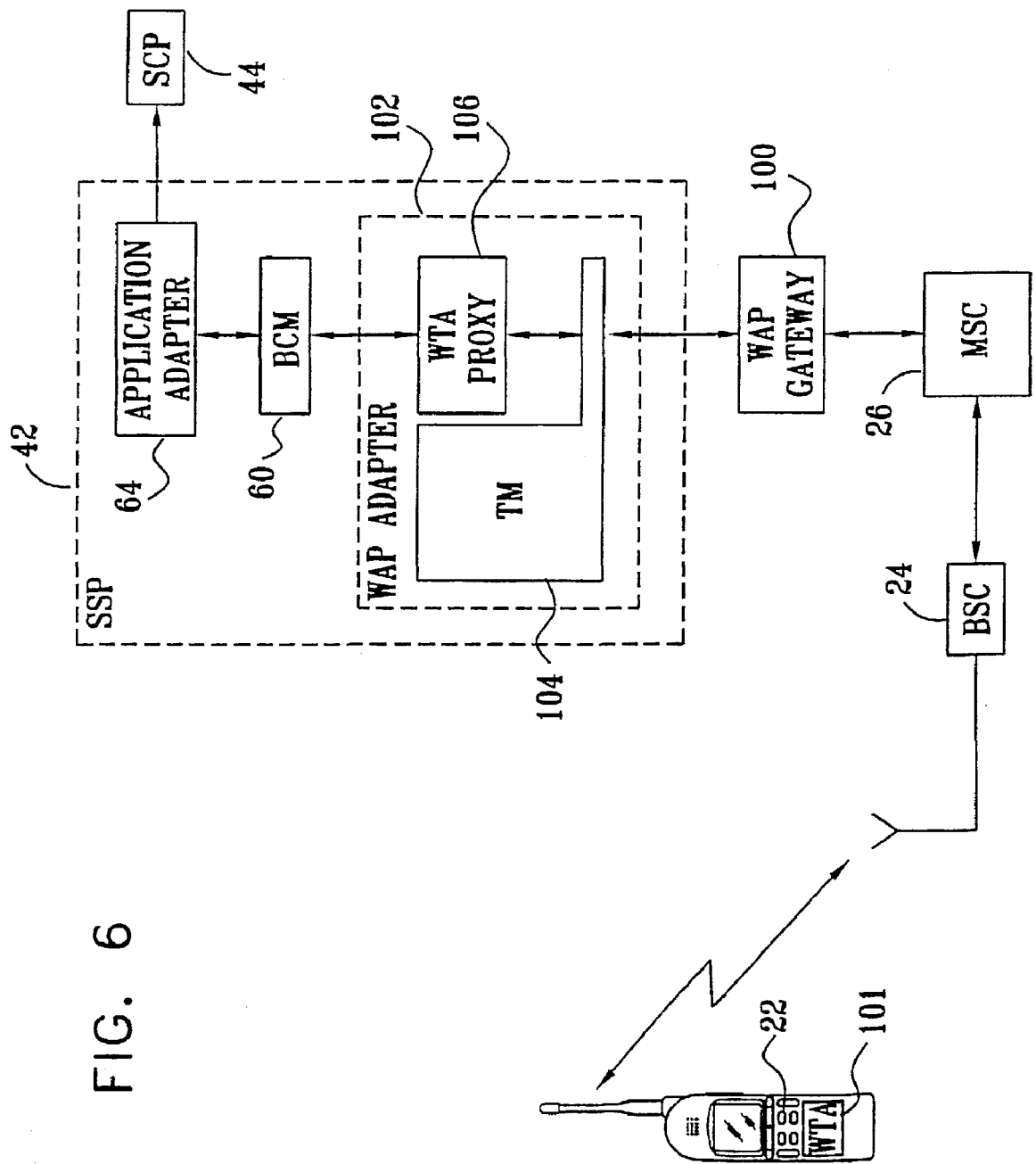
FIG. 6 is a block diagram that schematically shows details of a SSP gateway used in a cellular network in connection with a Wireless Telephony Application (WTA), in accordance with a preferred embodiment of the present invention.

FIG. 6 is a block diagram that schematically shows details of SSP gateway 42, illustrating a preferred embodiment of the present invention based on "handset intelligence" of mobile telephone 22. The telephone comprises a WAP browser, which includes a Wireless Telephony Application (WTA) interface 101, as is known in the art. The browser exchanges data with a WAP gateway 100 that is linked to MSC 26 in the cellular network. The WTA interface enables the telephone to be programmed so that the browser fetches data from an address indicated by a certain uniform resource locator (URL), via the WAP gateway, whenever a specified network event is recognized at the telephone. In other words, WTA interface 101 is instructed to "bind" certain events, such as incoming or outgoing calls, to certain URLs, wherein the binding is preferably stored in a repository in a memory of telephone 22. Alternatively or additionally, the binding may be performed by a network adapter 102 of SSP gateway 42 that is used for WTA, or by another element associated with WAP gateway 100.

For the implementation shown in FIG. 6, network adapter 102 is a WAP adapter, which communicates with WAP gateway 100 over a packet-switched intranet or, possibly, the Internet. WAP adapter 102 comprises two essential components: a terminal manager (TIV) 104 and a WTA proxy 106. TM 104 is responsible for multimedia interactions with telephone 22 and acts as the interface between the telephone and the WTA proxy. The TM receives events from WTA interface 101 and passes them on for processing by WTA proxy 106. The WTA proxy acts as a WTA server vis-a-vis the WTA client in telephone 22, so that events that are WTA-specific may be handled by the WTA proxy without passing them on to call processor 60. On the other hand, when an event requires the attention of SCP 44, WTA proxy 106 converts the event to the appropriate protocol-independent signaling primitive and passes it to call processor 60. The call processor then communicates with SCP 44 via application adapter 64, as described above.

TM 104 sends information back to telephone 22 based on the event responses from WTA proxy 106. Preferably, the TM sends instructions to the telephone in the form of scripts in Wireless Markup Language (WML), as is known in the WAP art. The scripts are most preferably tailored to the specific display capabilities of the particular telephone and its browser, as determined by TM 104. In addition to scripts that originate due to instructions from SCP 44 and WTA proxy 106, the TM may also generate scripts based on input from intelligent peripherals that communicate with telephone 22 via gateway 42.

Figure 7A:
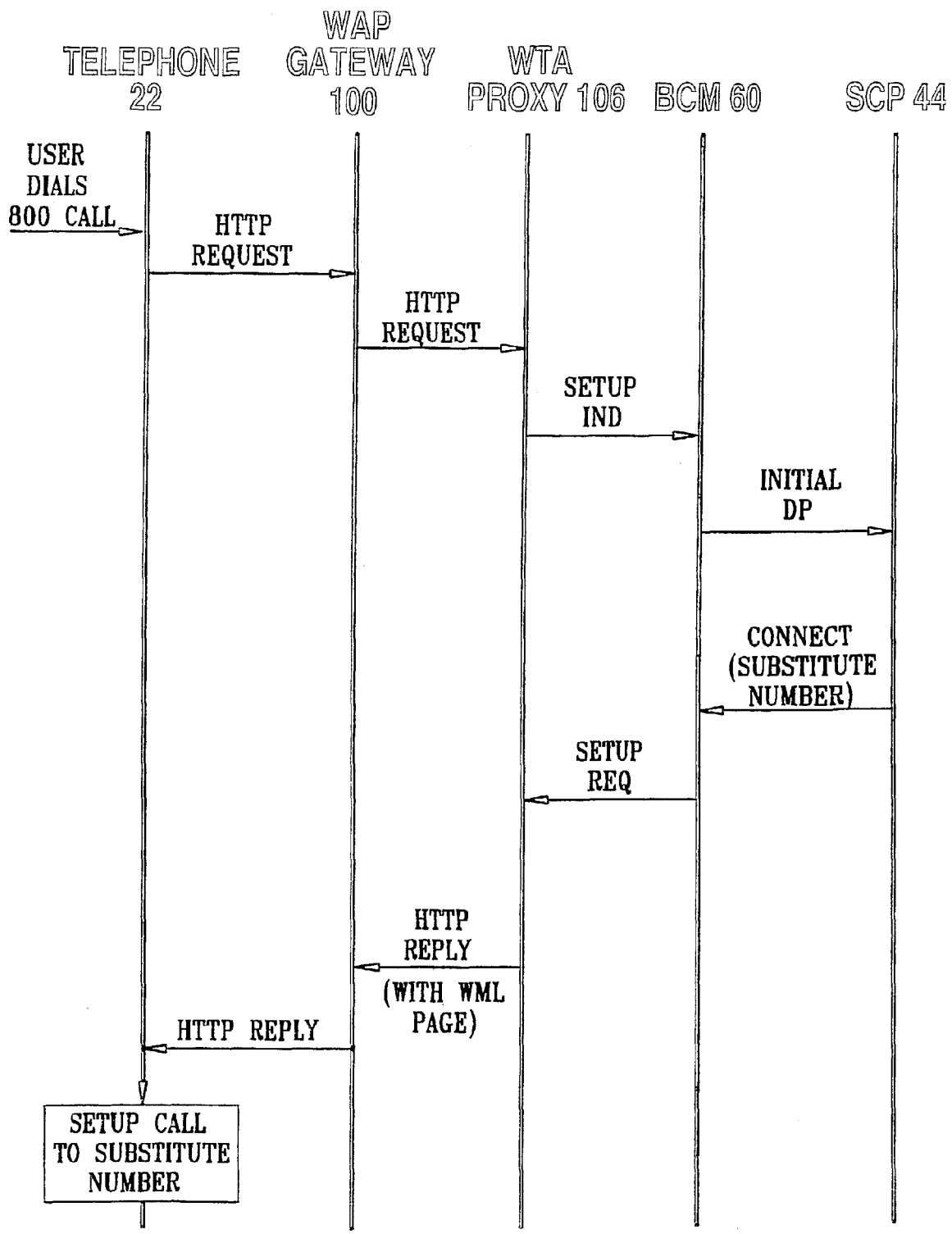
FIGS. 7A-7B are message flow diagrams that schematically illustrate handling of telephone call by a SSP gateway, in accordance with a preferred embodiment of the present invention.

FIG. 7A is a message flow diagram that schematically illustrates a method for initiating a call using telephone 22 and SSP gateway 42 with WAP adapter 102, in accordance with a preferred embodiment of the present invention. In the exemplary scenario shown in this figure, a user dials a call to a toll-free (800) number, say 1-800-800-8000. This is a "virtual number," which does not really exist in telephone network 28. WTA client interface 101 detects the outgoing call attempt and accordingly generates a WTA outgoing call event, defined by WTA as cc/oc(id,callingID). This event causes the WAP browser in telephone 22 to notify WAP gateway 100 of the outgoing call, in order to establish a connection with WAT proxy 106. Preferably, the WAP browser sends a HTTP request to the WAP gateway of the form http://wtaserv/oc.cgi?id=3&callingID=1-800-800-8000. The WAP gateway then passes the HTTP request on to WTA proxy 106 via TM 104. Here the active call is assigned an identifier id=3.

Upon receiving the HTTP request, WTA proxy 106 runs the cgi-bin script oc.cgi in order to extract the ID and called party information. It then sends a setup indication message to BCM 60, preferably in the form of a SigCom SetupInd message, along with the call parameters, over the network-independent interface between WAP adapter 102 and the BCM. Upon determining that SCP 44 is registered to receive this type of event, the BCM notifies application adapter 64, which then send an InitialDP message to SCP 44 in standard INAP format. This message indicates the type of service requested and the 800-number that the user has dialed.

SCP 44 looks up the 800-number in its database, and translates the virtual number into a real telephone number, say 1-212-432-1000. It sends the real number back to BCM 60 via adapter 64 using an INAP connect message. (In addition, SCP 44 presumably makes provision to bill the call recipient for the call, as well as other call setup operations known in the art.) The BCM translates the message into a call setup instruction message to WTA proxy 106, preferably in the form of a SigCon SetupReq message.

WTA proxy 106 uses the information in the setup message to generate a WML page that will instruct WTA client 101 to terminate the current call attempt and instead set up a call to the real telephone number. The WML page preferably includes include the unique resource identifier (URI) "wtai://vc/rc; 3" instructing the client to terminate the current call, and "wtai://vc/sc; 1-212-432-1000; 1" instructing the client to call the specified real telephone number instead. The WTA proxy passes the WML page in its HTTP reply to WAP gateway 100, which then passes the reply back to WTA client interface 101. Upon reading the WML page, the WTA client instructs telephone 22 to terminate the original call and to place a new call to the substitute number. The call then proceeds, with ongoing interaction with SCP 44 for billing and other purposes.

Figure 7B:
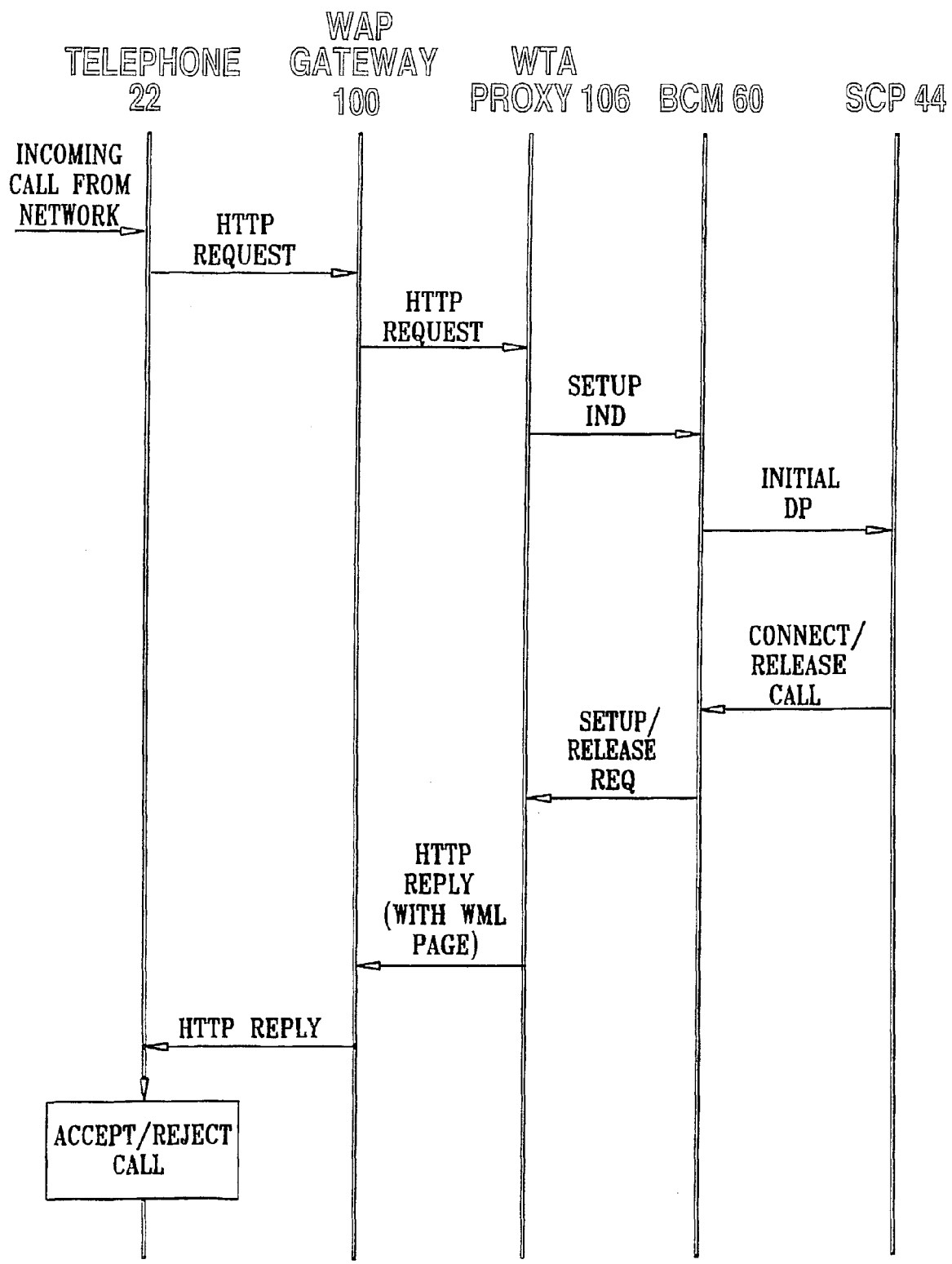

FIG. 7B is a message flow diagram that schematically illustrates a method for screening incoming calls to telephone 22 using SSP gateway 42 with WAP adapter 102, in accordance with another preferred embodiment of the present invention. In this case, the process begins when WTA client interface 101 detects an incoming call to telephone 22 from network 28, placed, for example, from telephone 212-432-1000. The client accordingly generates an incoming call event, cc/ic(id,callerID), and generates a HTTP request to WAP gateway 100 of the form http://wtaserv/ic.cgi?id=57&callerID=1-212-432-1000.

WAP gateway 100 passes the HTTP request to WTA proxy 106, which runs the ic.cgi script to extract the relevant parameters, and passes a setup indication message to BCM 60 as in the example of FIG. 7A described above. The BCM sends an initial DP message to SCP 44, which queries its database for the caller ID to determine whether telephone 22 should accept or reject this call. Based on the information in the database, SCP 44 sends an INAP call continue message (to connect) or call release message (to reject the call) back via adapter 64 to BCM 60. The BCM then generates a corresponding SetupReq or ReleaseReq SigCon message to WTA proxy 106.

As in the case of FIG. 7A, the WTA proxy generates a suitable WML page, depending on the message from BCM 60. If SCP 44 answered that the call should be rejected, for example, the WML page will preferably include the URI "wtai:/igsm/cr; 57". This page is returned in the HTTP reply from WTA proxy 106 via WAP gateway 100 to client 101. The client then instructs telephone 22 whether to accept or reject the call.

Although preferred embodiments are described hereinabove with reference to certain specific network types, emphasizing cellular networks in particular, the principles of the present invention may similarly be applied in networks of substantially any type that is suitable for provision of IN services. Similarly, although these preferred embodiments relate to certain exemplary service types and scenarios, the extension of the principles of these embodiments to other services and situations will be apparent to those skilled in the art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A service gateway, comprising:
   one or more network adapters, configured to capture signaling messages in respective communication networks and to process the signaling messages to generate network signaling primitives indicative of network events in a network-independent format;
   one or more application adapters, configured to communicate with one or more application servers, which are external to the service gateway and have respective application protocols; and
   a call processor, coupled to receive and process the signaling primitives from the network adapters so as to generate service requests, which are independent of the application protocols, for processing by the one or more application servers, and to receive and process service instructions from the application servers in response to the service requests so as to generate network instruction primitives to the one or more network adapters, causing the network adapters to convey signaling instructions to the respective networks,
   wherein the call processor is adapted to generate service request primitives responsive to the signaling primitives, and wherein the application adapters are coupled to receive the service request primitives from the call processor and, responsive thereto, to generate the service requests to the application servers using the respective application protocols of the servers.

2. A gateway according to claim 1, wherein the application servers are based on respective application platforms, including at least two different platforms having different respective application protocols, and wherein the one or more application adapters comprise a plurality of application adapters, which are respectively configured to communicate with the respective application servers using the different application protocols.

3. A gateway according to claim 1, wherein the communication networks comprise two networks having different, respective network signaling protocols, and wherein the one or more network adapters comprise at least two network adapters, which are respectively configured to capture the signaling messages in the different network signaling protocols.

4. A gateway according to claim 3, wherein the two networks comprise a circuit-switched network and a packet network.

5. A gateway according to claim 3, wherein one of the two networks operates according to a Signaling System 7 (SS7) protocol, while the other operates according to a non-SS7 protocol.

6. A gateway according to claim 1, wherein at least one of the one or more network adapters is configured to capture the signaling messages from one or more switches in at least one of the communication networks and to convey the signaling instructions to the one or more switches.

7. A gateway according to claim 6, wherein the at least one of the communication networks comprises a cellular telephone network, and wherein the switches comprise mobile switching centers (MSCs).

8. A gateway according to claim 6, wherein the at least one of the network adapters is configured to capture the signaling messages simultaneously from multiple switches in the at least one of the communication networks.

9. A service gateway, comprising:
   one or more network adapters, configured to capture signaling messages in respective communication networks and to process the signaling messages to generate network signaling primitives indicative of network events in a network-independent format;
   one or more application adapters, configured to communicate with one or more application servers, which are external to the service gateway and have respective application protocols; and
   a call processor, coupled to receive and process the signaling primitives from the network adapters so as to generate service requests, which are independent of the application protocols, for processing by the one or more application servers, and to receive and process service instructions from the application servers in response to the service requests so as to generate network instruction primitives to the one or more network adapters, causing the network adapters to convey signaling instructions to the respective networks,
   wherein at least one of the one or more network adapters comprises a telephony server, which is configured to communicate with a client program running on a user communication terminal, wherein the client program sends the signaling messages to the telephony server responsive to voice calls involving the user communication terminal.

10. A gateway according to claim 9, wherein the telephony server returns the signaling instructions to the user communication terminal in the form of instructions to be executed by the client program.

11. A gateway according to claim 10, wherein the client program comprises a browser program, and wherein the instructions are in the form of scripts to be run by the browser program.

12. A gateway according to claim 11, wherein the browser program comprises a Wireless Application Protocol (WAP) browser having a Wireless Telephony Application (WTA) interface, and wherein the telephony server comprises a WTA proxy.

13. A gateway according to claim 11, wherein the client program sends the signaling messages in the form of Hypertext Transfer Protocol (HTTP) requests directed to different uniform resource locators (URLs) that are associated with the telephony server and are respectively bound to different types of the events that are detected by the user communication terminal, and wherein the telephony server processes the HTTP requests and returns the scripts responsive to the URLs.

14. A service gateway, for providing application services to a communication network using application servers having different respective application protocols, the gateway comprising:
- a call processor, coupled to receive and process indications of network events occurring in a communication network and, responsive thereto, to generate service request primitives in a form substantially independent of the application protocols;
- a plurality of application adapters, which are coupled to receive the service request primitives from the call processor and, responsive thereto, to generate service requests to at least two of the application servers using the different, respective application protocols, and to receive and process service instructions from the application servers in response to the service requests so as to generate service response primitives to the call processor, causing the call processor to generate signaling instructions to be conveyed to the network; and
- a telephony server, which is configured to communicate with a client program running on a user communication terminal, wherein the client program sends the indications of the network events to the telephony server responsive to voice calls involving the user communication terminal, and wherein the telephony server returns the signaling instructions to the user communication terminal in the form of instructions to be executed by the client program.

15. A gateway according to claim 14, wherein the call processor is configured to receive the signaling messages from one or more switches in the communication network, and to generate the signaling instructions to be conveyed to the switches.

16. A gateway according to claim 14, wherein the plurality of the application adapters comprises an Intelligent Network Application Protocol (NAP) adapter for conveying the service requests to and receiving the service instructions from a Service Control Point (SCP) coupled thereto.

17. A gateway according to claim 14, wherein the plurality of the application adapters comprises a Parlay adapter for conveying the service requests to and receiving the service instructions from an application server coupled thereto.

18. A gateway according to claim 14, wherein the plurality of the application adapters comprises a customized applications for mobile network enhanced logic (CAMEL) adapter for conveying the service requests and receiving the service instructions in connection with a roaming application.

19. A gateway according to claim 14, wherein the call processor is further coupled to communicate with an Intelligent Peripheral and to generate the signaling instructions so as to create a connection via the network between the Intelligent Peripheral and a user communication terminal, under control of the call processor.

20. A method for providing a communication service, comprising:
- capturing signaling messages in one or more communication networks;
- processing the signaling messages to generate network signaling primitives indicative of network events in a network-independent format;
- communicating with one or more external application servers having respective application protocols;
- processing the signaling primitives using a common, network-independent call model for the one or more networks, so as to generate service requests, which are independent of the application protocols, for processing by the one or more application servers;
- receiving service instructions from the application servers in response to the service requests; processing the service instructions using the call model, so as to generate network instruction primitives in the network-independent format; and
- processing the network instruction primitives to generate signaling instructions to the respective networks,
- wherein processing the signaling primitives comprises generating protocol-independent service request primitives responsive to the signaling primitives and processing the service request primitives to generate the service requests to the servers in accordance with the respective application protocols of the servers, wherein the application protocols comprise at least two different, respective application protocols according to which two different ones of the servers operate, and wherein processing the service request primitives comprises generating the service requests using the different, respective application protocols of the servers.

21. A method according to claim 20 wherein the communication networks comprise two networks having different, respective network signaling protocols, and wherein processing the signaling messages comprises processing the messages in the different network signaling protocols to generate the signaling primitives in the same network-independent format for both of the networks.

22. A method according to claim 21, wherein the two networks comprise a circuit-switched network and a packet network.

23. A method according to claim 21, wherein the different network signaling protocols comprise a Signaling System 7 (SS7) protocol and a non-SS7 protocol.

24. A method according to claim 20, wherein capturing the signaling messages comprises capturing the messages in from one or more switches in at least one of the communication networks.

25. A method according to claim 24, wherein processing the network instruction primitives comprises conveying the signaling instructions to the one or more switches.

26. A method according to claim 24, wherein the at least one of the communication networks comprises a cellular telephone network, and wherein the switches comprise mobile switching centers (MSCs).

27. A method according to claim 24, wherein capturing the signaling messages comprises capturing the messages simultaneously from multiple switches in the at least one of the communication networks.

28. A method for providing a communication service, comprising:
- capturing signaling messages in one or more communication networks;
- processing the signaling messages to generate network signaling primitives indicative of network events in a network-independent format;
- communicating with one or more external application servers having respective application protocols;
- processing the signaling primitives using a common, network-independent call model for the one or more networks, so as to generate service requests. which are independent of the application protocols. for processing by the one or more application servers;
- receiving service instructions from the application servers in response to the service requests; processing the service instructions using the call model, so as to generate network instruction primitives in the network-independent format; and processing the network instruction primitives to generate signaling instructions to the respective networks wherein capturing the signaling messages comprises receiving the messages from a client program running on a user communication terminal, which sends the signaling messages responsive to voice calls involving the user communication terminal.

29. A method according to claim 28, wherein receiving the messages comprises receiving the signaling messages using a telephony server in communication with the client program.

30. A method according to claim 28, wherein processing the network instruction primitives comprises returning the signaling instructions to the user communication terminal in the form of instructions to be executed by the client program.

31. A method according to claim 30, wherein the client program comprises a browser program, and wherein returning the signaling instructions comprises conveying scripts to the user communication terminal to be run by the browser program.

32. A method according to claim 31, wherein the browser program comprises a Wireless Application Protocol (WAP) browser having a Wireless Telephony Application (WTA) interface, and wherein the telephony server comprises a WTA proxy.

33. A method according to claim 31, wherein receiving the messages comprises receiving Hypertext Transfer Protocol (HTTP) requests directed by the browser program to different uniform resource locators (URLs) that are associated with the telephony server and are respectively bound to different types of the-events that are detected by the user communication terminal, and wherein processing the signaling messages comprises processing the HTTP requests so as to return the scripts responsive to the URLs.

34. A method for providing application services to a communication network using application servers having predefined respective application protocols, the method comprising:

receiving indications of network events occurring in a communication network;

responsive to the events, generating service request primitives in a form substantially independent of the application protocols;

processing the service request primitives so as to generate service requests to at least two of the application servers using the different, respective application protocols;

receiving service instructions from the application servers in the different, respective application protocols in response to the service requests;

processing the service instructions so as to generate service response primitives in the form substantially independent of the application protocols; and responsive to the service response primitives, generating signaling instructions to be conveyed to the network, wherein receiving the indications comprises receiving messages from a client program running on a user communication terminal, responsive to voice calls involving the user communication terminal.

35. A method according to claim 34, wherein receiving the indications of the network events comprises receiving signaling messages from one or more switches in the communication network.

36. A method according to claim 35, wherein generating the signaling instructions comprises conveying the instructions to the switches.

37. A method according to claim 34, wherein generating the signaling instructions comprises returning the signaling instructions to the user communication terminal in the form of instructions to be executed by the client program.

38. A method according to claim 34, wherein processing the service request primitives comprises generating the service requests in accordance with an Intelligent Network Application Protocol (INAP), and conveying the requests using INAP to a Service Control Point (SCP).

39. A method according to claim 34, wherein processing the service request primitives comprises generating the service requests in accordance with a Parlay protocol, and conveying the requests to a Parlay application server.

40. A method according to claim 34, wherein processing the service request primitives comprises generating the service requests in accordance with a customized applications for mobile network enhanced logic (CAMEL) protocol, and conveying the requests in accordance with the protocol in connection with a roaming application.

41. A method according to claim 34, and comprising communicating with an Intelligent Peripheral responsive to the events, and wherein generating the signaling instructions comprises instructing the network to create a connection between the Intelligent Peripheral and a user communication terminal.

* * * * *